MAGNETIC MEMORY MATRIX HAVING NOISE CANCELLATION WORD CONDUCTOR

Filed March 19, 1964 2 Sheets-Sheet 1

INVENTOR.
RABAH SHAHBENDER
BY
Carl V. Olson
Attorney

INVENTOR.
RABAH SHAHBENDNER
BY Carl V. Olson
Attorney 3,308,448

MAGNETIC MEMORY MATRIX HAVING NOISE CANCELLATION WORD CONDUCTOR

Rabah Shahbender, Princeton, N.J., assignor to Radio Corporation of America, a corporation of Delaware Filed Mar. 19, 1964, Ser. No. 353,134
6 Claims. (Cl. 340—174)

This invention relates to high-speed, random-access magnetic memory arrays, and particularly to memory arrays employing fewer than two magnetic memory elements for the storage of each information bit.

A magnetic memory element or core is conventionally made of a square-loop ferrite material, and it has two remanent flux states for representing the storage of "0" and "1" information bits. In order to read out the stored information, a read pulse is applied to the memory element in a polarity tending to switch the flux to the "0" state. If the element was in the "1" state, the flux is switched in direction and this induces a sense signal which indicates that a "1" was stored in the memory element. If the element was ready in the "0" state, no appreciable flux is switched and the absence of an induced sense signal indicates that a "0" was stored.

The operation of magnetic memories at higher speeds requires the use of shorter-duration read pulses of appropriately higher amplitude. When a high-amplitude read pulse is applied to a memory element storing a "0," there is an undesirable switching of additional flux in the "0" direction which elastically returns to, or very close to, the initial remanent "0" state at the termination of the read pulse. This elastic flux switching produces a sense signal which must be considered to be noise, because the absence of a sense signal is desired when reading a stored "0." When a high-amplitude read pulse is applied to a memory element storing a "1," there is a switching of non-elastic flux as the flux changes from the "1" remanent flux state toward the "0" remanent flux state. In addition, there is a switching of elastic flux beyond the "0" remanent flux state, and back again.

The sense signal induced when reading a "1" is greater than the noise signal induced when reading a "0" by an amount attributable to the switching of non-elastic flux. The amount of non-elastic flux switched is limited by the fact that, where high speed operation is desired, the write pulses are also of very short duration, and they must be limited in amplitude. Therefore write pulses used to write a "1" do not completely switch all of the flux in the memory element to the "1" direction. The situation encountered is one in which the signal sensed when reading a "1" is only slightly greater than the noise signal sensed when reading a "0."

As higher operating speeds are employed, it becomes increasingly difficult to distinguish between the amplitude of a "1" signal due to non-elastic and elastic switching and the noise signal due solely to elastic flux switching when a "0" information bit is read. It is known to improve the signal-to-noise ratio by employing two magnetic memory elements or cores for each information bit in an arrangement where elastic flux switching noise from one core is used to cancel elastic flux switching noise from the other core. This solution to the problem is effective, but it requires twice as many memory elements for the storage of a given number of information bits.

It is a general object of this invention to provide an improved high speed memory array which requires only slightly more than one magnetic memory element for each information bit, and which provides an improved "1" signal-to-"0"-noise ratio by canceling noise due to undesired flux switching.

It is another object to provide an improved magnetic memory array including memory elements along a plurality of information word lines, and additional memory elements along an extra noise cancellation word line in an arrangement which serves to cancel the noise due to undesired flux switching.

It is a further object to provide an improved magnetic memory array having the advantage of requiring each memory element to be linked by only two conductors.

It is yet another object to provide an improved memory array in which the noise capacity coupled from a word line to a digit-sense line during read is substantially canceled.

According to one specific illustrative example of the invention, there is provided an array of memory elements having a plurality of information word conductors and a noise cancellation word conductor. A plurality of digit-sense conductors are in crossed relation with the word conductors, and magnetic memory elements are provided at the crossovers of the conductors. Means are provided to apply a write pulse to any selected one of the information word conductors concurrently with the application of digit pulses to any selected ones of the digit-sense conductors. Means are also provided to apply a read pulse to any selected one of the information word conductors concurrently with the application of a read pulse to the noise cancellation word conductor. A noise signal on a digit-sense conductor due to elastic flux switching in an information memory element is substantially canceled, on the conductor, by a noise signal due to elastic flux switching in a noise cancellation memory element. Noise capacitively coupled to a digit-sense conductor is also substantially canceled on the conductor.

Figure 1:
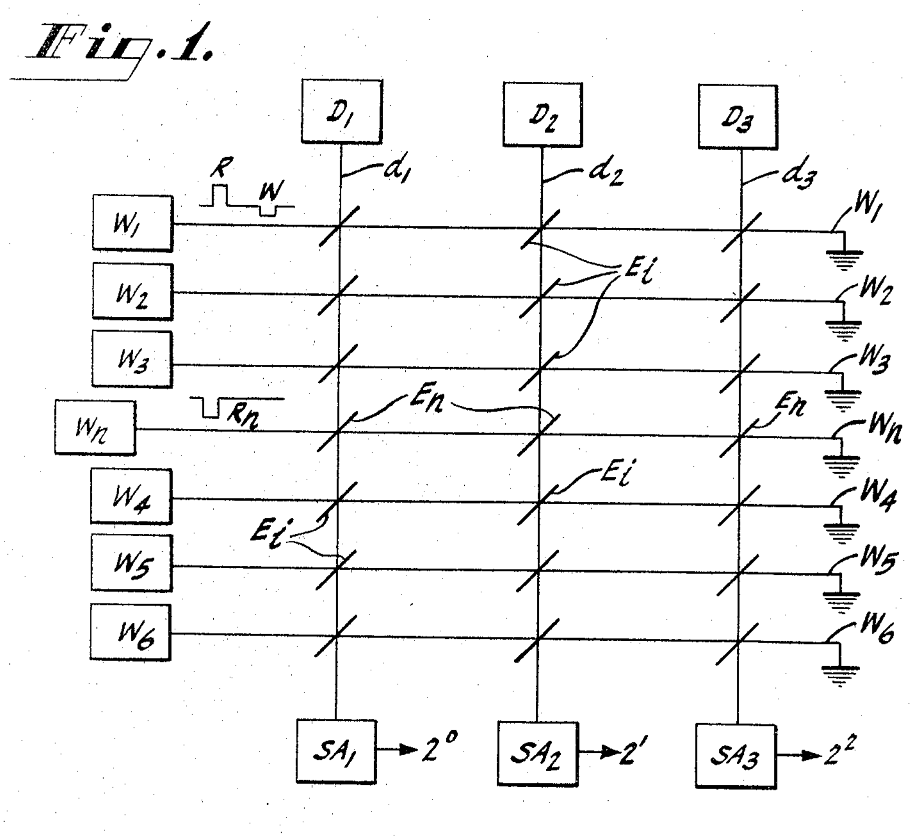
FIG. 1 is a diagram of a memory array according to the invention.

Referring now in greater detail to FIG. 1, there is shown a magnetic memory array including a plurality of information word conductors $w_1$ through $w_6$, each connected to a respective word driver $W_1$ through $W_6$. There is also provided one noise cancellation word conductor $w_n$ coupled to a respective noise cancelation word driver $W_n$.

A plurality of digit-sense conductors $d_1$, $d_2$ and $d_3$ are arranged in crossed relation with the word conductors. Information magnetic memory elements $E_1$ are located at crossovers of an information word conductor and a digit-sense conductor. Noise canceling magnetic memory elements $E_n$ are located at crossovers of the noise cancellation word conductor $w_n$ and the digit-sense conductors. The memory elements $E_1$ and $E_n$ may be square-loop magnetic ferrite cores each threaded by one word conductor and one digit-sense conductor.

The digit-sense conductors $d_1$ through $d_3$ are each coupled to a respective digit driver $D_1$ through $D_3$ and to a respective sense amplifier $SA_1$ through $SA_3$. A common return path, indicated by the conventional ground symbol, is provided for each of the drivers and the sense amplifiers. The memory array shown is illustrative of arrays having a much larger number of memory elements. The arrangement shown is one including a plurality of information word conductors and a single noise canceling word conductor associated with the information word conductors. If the memory includes so many information word conductors that propagation delays along the digit-sense conductors are appreciable, the arrangement may be extended to employ a plurality of groups of information word conductors each having associated with it a single noise cancellation word conductor. A noise cancellation word conductor is preferably located at the center of its associated information word conductors to minimize the maximum difference in time of arrival of signals at the sense amplifiers from cancellation and information words.

Figure 4:
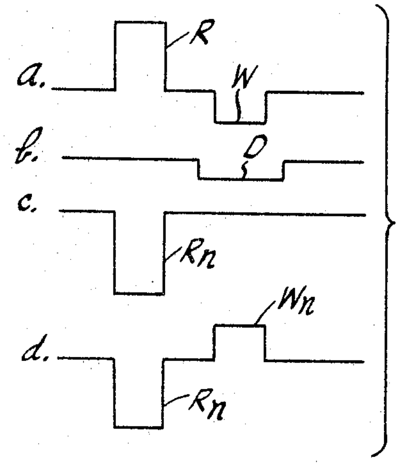
FIG. 4 is a chart of driving current waveforms which will be referred to in describing the operation of the system of FIG. 1.

The word drivers $W_1$ through $W_6$ provide an output as shown in FIG. 4*a* including a read pulse R of one polarity followed by a write pulse W of the opposite polarity. The word drivers $W_1$ through $W_6$ are selectively energized one at a time for the purpose of reading information from, and writing information into, a corresponding selected information word storage location. Whenever one of the word drivers $W_1$ through $W_6$ is energized, the noise cancellation word driver $W_n$ is simultaneously energized to provide an output, as shown in FIG. 4*c*, consisting solely of a read pulse $R_n$ having an opposite polarity compared with the read pulse R, and occurring concurrently therewith.

The digit drivers $D_1$ through $D_3$ are selectively energized to provide an output pulse D as shown in FIG. 4*b* solely when the writing of a "1" information bit is desired. (Alternatively, the known bipolar digiting scheme may be employed.) The digit pulse D is timed to overlap the duration of the write pulse W and to be effective in the same direction or polarity as the write pulse W. The write pulse W and the digit pulse D have amplitudes such that neither pulse alone is large enough to cause the amount of flux switching required for the writing of a "1," but the combined amplitude of the two pulses is sufficient to write a "1."

Figures 2, 3:
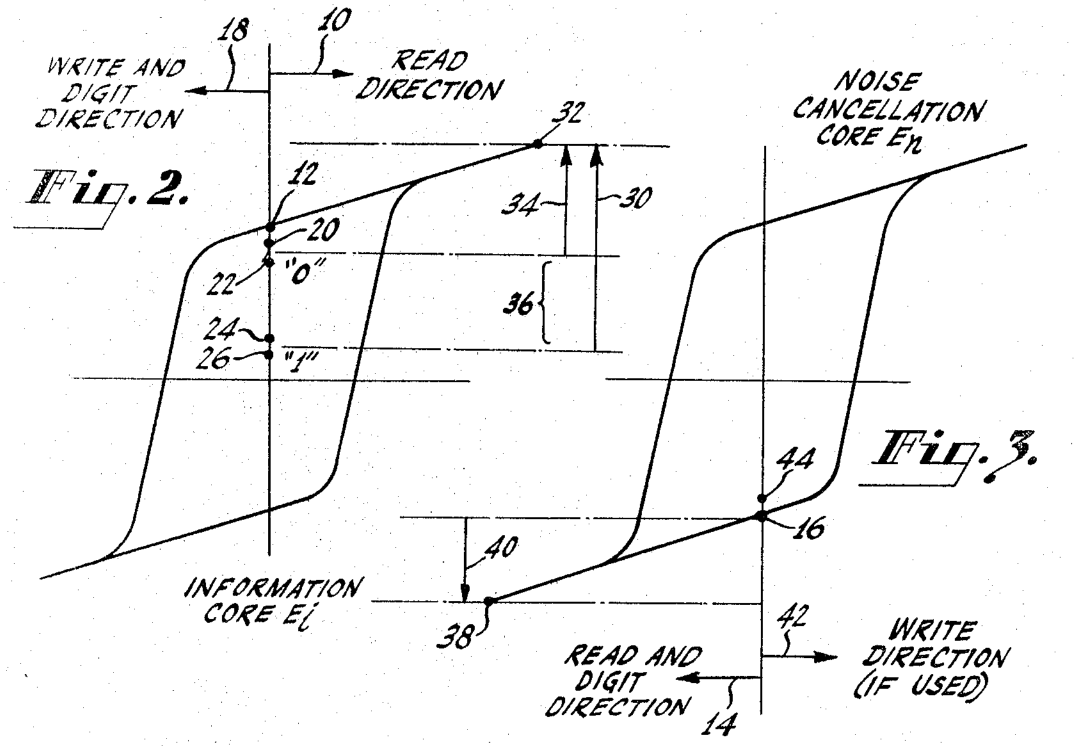
FIG. 2 is a representation of a hysteresis loop characteristic which wil be referred to in describing the operation of an information storing magnetic memory element in the system of FIG. 1.
FIG. 3 is a representation of a hysteresis loop characteristic which will be referred to in describing the operation of a noise canceling memory element in the system of FIG. 1.

The operation of the memory array of FIG. 1 will now be described with references also to the hysteresis loop characteristics shown in FIGS. 2 and 3. It is the general practice to read information from a selected word line before writing information back into the word line. Following the application of a read pulse R to a selected word line in the direction 10 in FIG. 2, information that may have been stored in a memory element $E_i$ along the line is cleared out and the remanent flux is in an amount represented by the point 12 corresponding with the storage of an undisturbed "0." Following the application simultaneous with read pulse R, of a read pulse $R_n$ to a noise cancellation memory element $E_n$ in the direction 14 in FIG. 3, there results an amount of remanent flux represented by the point 16.

The "0"-indicating remanent flux 12 of the information memory element may be disturbed by one or more write pulses W occurring alone. These write pulses cause flux to be switched around minor loops which may result in a remanent flux 20 representing a write-disturbed "0." Likewise, the information memory element may be disturbed by one or more digit pulses D occurring alone to result in a remanent flux 22 representing a digit-disturbed "0."

If the write pulse W occurs concurrently with a digit pulse D, flux is switched in the information memory element in a minor loop leaving an amount of remanent flux 24 representing a stored "1." The stored "1" may be disturbed by the subsequent application of solely a digit pulse D to result in a disturbed "1" remanent flux represented by the point 26.

To summarize the conditions of the information memory element, the points 12, 20 and 22 represent somewhat different remanent flux states all representing the storage of a "0" but differing somewhat in accordance with the prior disturbing history of the magnetic element. Likewise, the remanent flux quantities 24 and 26 both represent the storage of a "1" but they differ due to the disturbing history of the element.

The results of subsequently applying a read pulse R to an information memory element will now be described. If the remanent flux in the memory element is at point 24 or point 26 representing the storage of "1," the read pulse R in the direction 10 causes a switching of an amount of flux 30 to the point 32, after which the flux returns to the point 12. If the memory element was storing a "0," an amount of flux 34 is switched to the ponit 32, after which almost all of the flux switched returns to the amount represented by the point 12.

The reading of a stored "0" results in the switching of an appreciable quantity 34 of flux which induces a corresponding "0" noise signal on the digit-sense conductor at a time when the absence of a sense signal is desired to represent the stored "0." The reading of a stored "1" results in the switching of a greater quantity 30 of flux which induces a corresponding "1" signal on the digit-sense conductor.

Figure 5:
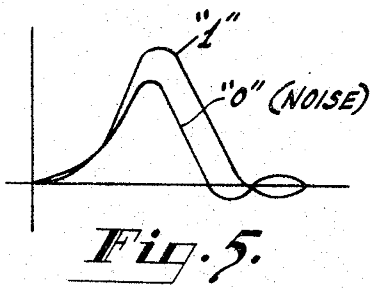
FIG. 5 is a chart of output sense signals obtained in the absence of noise cancellation means.

The "0" noise and "1" sense signals may have amplitudes as represented by FIG. 5. The "0" noise and "1" sense signals must be distinguished by the sense amplifier to provide a correct indication of the stored information. When memories are operated at very high speeds, the difficulty of distinguishing between the "0" and "1" signals increases and imposes a limitation on the operating speed of the memory. This difficulty is overcome by the use of noise cancellation memory elements, as will be described.

At the same time that a read pulse R is applied to an information core, a read pulse $R_n$ is applied in the direction 14 to the corresponding noise cancellation memory element $E_n$ which is linked by the same digit-sense conductor linking the information memory element. The read pulse $R_n$ causes an elastic switching of flux in the noise cancellation memory element from the remanent amount 16 to the extreme amount 38, after which the flux returns to the point 16. The amount 40 of flux switched corresponds with the amount 34 of flux switched in the information memory element.

Figure 6:
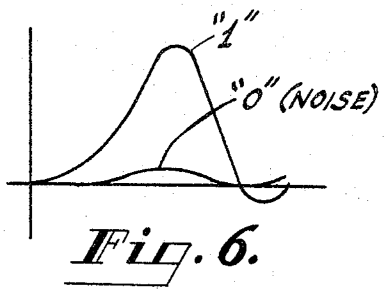
FIG. 6 is a chart of output sense signals obtained when the noise cancellation scheme of the invention is used.

The flux switching 40 in the noise cancellation element is in the opposite direction compared with the flux switching 34 in the information element. These two opposite-polarity flux changes induces substantially equal and opposite sense voltages in the common digit-sense conductor linking both of the elements. The sense signal due to flux switching in the noise cancellation element therefore substantially cancels the undesired sense signal due to undesired flux switching in the information element. There results a very great improvement in the ratio between the "1"-indicating sense signal on the digit-sense conductor and the almost completely canceled "0" noise signal on the same digit-sense conductor. The "1" and "0" noise sense signals presented to the sense amplifier may then be as represented by FIG. 6.

The amplitude of the flux change 40 in the noise cancellation element can be increased to equal the undesired flux change 34 in the information element by making the read pulse $R_n$ proportionately larger than the read pulse R. Another way in which the noise canceling flux change 40 may be increased is by employing noise canceling cores $E_n$ having an aperture of smaller diameter than is used for the information elements $E_i$.

Yet another way of increasing the noise canceling flux change 40 is to employ a noise canceling word driver $W_n$ which provides an output as shown in FIG. 4*d* having not only a read pulse $R_n$ but having also a following write pulse $W_n$. The write pulse $W_n$ acts in the direction 42 in FIG. 3 and causes a minor loop flux traversal such that the write-disturbed remanent flux settles at a point 44. Then, a subsequent read pulse $R_n$, in switching flux from the point 44 to the point 38, causes a greater flux change, and the inducing of a larger noise canceling signal.

The noise cancellation easily achieved by this system permits much higher operating speeds, and requires only a few more memory elements in an array than are required in a one-core-per-bit array. One noise cancellation element (or word) can serve 128 or more information elements (or words).

The memory array also provides a substantial cancellation of the noise which is capacitively coupled from an energized word conductor to digit-sense conductors during the application of a read pulse to the word conductor. If for example, the word driver $W_1$ is energized to direct a read pulse R through the word conductor $w_1$, a noise pulse is capacitively coupled to all of the digit-sense conductors $d_1$, $d_2$ and $d_3$. The amplitude of the noise pulse capacitively coupled to the digit-sense conductor $d_1$ is greater in amplitude than the noise pulse capacitively coupled to the digit-sense conductor $d_3$, because the read pulse voltage at the left end of the word conductor $w_1$ is higher than the read pulse voltage at the right-hand grounded end of the conductor $w_1$.

Similarly, with the generation of a read pulse R by the selected word driver $W_1$, the noise cancellation word driver $W_n$ is energized to direct an opposite-polarity pulse $R_n$ through the noise cancellation word conductor $w_n$. The noise cancellation pulse $R_n$ also has a higher voltage at the left end of the cancellation word conductor $w_n$ than at the right-hand grounded end. The noise cancellation pulse $R_n$ has an opposite polarity compared with the read pulse R so that it causes opposite polarity noise pulses to be capacitively coupled to each of the digit-sense conductors. Furthermore, the noise canceling pulses capacitively coupled to each of the digit-sense conductors $d_1$, $d_2$ and $d_3$ has substantially the same amplitude as the noise pulses capacitively coupled from the selected word conductor $w_1$. The two signals capacitively coupled to each digit-sense conductor substantially cancel each other in the digit-sense conductor, so that none of the capacitively coupled noise, or very little of it, reaches the corresponding sense amplifier SA.

To summarize, the memory array, during the reading out of information from the magnetic cores along a selected word conductor, provides for the substantial cancellation of noise due to capacitive coupling from a word conductor to digit conductors, as well as the substantial cancellation of the noise due to reversible magnetic flux switching.

What is claimed is:

1. A magnetic memory comprising
a plurality of information word conductors and a noise cancellation word conductor,
a plurality of digit-sense conductors crossing said word conductors,
magnetic memory elements at crossovers of said word and digit-sense conductors,
means to apply a write pulse to any selected one of said information word conductors concurrently with the application of digit pulses to any selected ones of said digit-sense conductors, and
means to apply a read pulse to any selected one of said information word conductors concurrently with the application of a read pulse to said noise cancellation word conductor to induce on each digit-sense conductor a signal due to flux switching in a memory element along the noise cancellation conductor which substantially cancels a signal due to undesired flux switching in a memory element along an information word conductor.

2. A magnetic memory comprising
a plurality of information word conductors and a noise cancellation word conductor, a plurality of digit-sense conductors crossing said word conductors,
magnetic memory elements at crossovers of said word and digit-sense conductors,
means to apply a write pulse to any selected one of said information word conductors concurrently with the application of digit pulses to any selected ones of said digit-sense conductors,
means to apply a read pulse to any selected one of said information word conductors concurrently with the application of a read pulse to said noise cancellation word conductor, and
sense amplifiers coupled to said digit-sense conductors,
whereby the signal induced on a digit-sense conductor due to undesired flux switching in a memory element along the noise cancellation conductor is substantially canceled by a signal due to flux switching in a memory element along an information word conductor.

3. A magnetic memory comprising
a plurality of information word conductors and a noise cancellation word conductor,
a plurality of digit-sense conductors crossing said word conductors,
magnetic memory elements at the crossovers of said word and digit-sense conductors,
means to apply a write pulse to any selected one of said information word conductors concurrently with the application of digit pulses to any selected ones of said digit-sense conductors, and
means to apply a read pulse of one polarity to any selected one of said information word conductors concurrently with the application of a read pulse of opposite polarity to said noise cancellation word conductor.

4. A magnetic memory comprising
a plurality of information word conductors and a noise cancellation word conductor,
a plurality of digit-sense conductors crossing said word conductors,
magnetic memory elements at the crossovers of said word and digit-sense conductors,
means to apply a write pulse to any selected one of said information word conductors concurrently with the application of digit pulses to any selected ones of said digit-sense conductors,
means to apply a read pulse of one polarity to any selected one of said information word conductors concurrently with the application of a read pulse of opposite polarity to said noise cancellation word conductor, and
sense amplifiers coupled to respective ones of said digit-sense conductors.

5. A magnetic memory comprising
a plurality of information word conductors and a noise cancellation word conductor,
a plurality of digit-sense conductors crossing said word conductors,
magnetic memory elements at the crossovers of said word and digit-sense conductors,
means to apply a write pulse to any selected one of said information word conductors concurrently with the application of digit pulses to any selected ones of said digit-sense conductors,
sense amplifiers coupled to respective ones of said digit-sense conductors, and
means to apply a read pulse of one polarity to any selected one of said information word conductors concurrently with the application of a read pulse of opposite polarity to said noise cancellation word conductor to induce on each digit-sense conductor a signal due to flux switching in a memory element along the noise cancellation word conductor which substantially cancels a signal induced on the same digit-sense conductor due to undesired flux switching in a memory element along an information word conductor.

6. A magnetic memory as defined in claim 5 wherein said sense amplifiers have single ended inputs.

References Cited by the Examiner

UNITED STATES PATENTS

| | | | |
|---|---|---|---|
| 3,115,619 | 12/1963 | Barrett et al. | 340—174 |
| 3,155,946 | 11/1964 | Stern et al. | 340—174 |
| 3,193,809 | 7/1965 | Ullman | 340—174 |
| 3,238,516 | 3/1966 | Hore | 340—174 |

BERNARD KONICK, *Primary Examiner.*

S. M. URYNOWICZ, *Assistant Examiner.*